US007393586B2

(12) United States Patent
Okada et al.

(10) Patent No.: US 7,393,586 B2
(45) Date of Patent: Jul. 1, 2008

(54) HIGHLY OXIDATION-RESISTANT COPPER POWDER FOR CONDUCTIVE PASTE AND PROCESS FOR PRODUCING THE POWDER

(75) Inventors: Yoshihiro Okada, Okayama (JP); Atsushi Ebara, Honjo (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 257 days.

(21) Appl. No.: 10/311,884

(22) PCT Filed: Apr. 22, 2002

(86) PCT No.: PCT/JP02/04000

§ 371 (c)(1),
(2), (4) Date: May 8, 2003

(87) PCT Pub. No.: WO02/087809

PCT Pub. Date: Nov. 7, 2002

(65) Prior Publication Data

US 2003/0178604 A1 Sep. 25, 2003

(30) Foreign Application Priority Data

Apr. 27, 2001 (JP) ............................ 2001-132159

(51) Int. Cl.

| | |
|---|---|
| ***B22F 1/02*** | (2006.01) |
| ***B32B 5/16*** | (2006.01) |
| ***C23C 22/00*** | (2006.01) |
| ***H01B 1/02*** | (2006.01) |

(52) U.S. Cl. ...................... 428/403; 428/404; 252/62.2; 252/512; 427/212; 427/216; 427/219; 148/432; 75/228

(58) Field of Classification Search ................. 252/512, 252/518.1; 428/570, 404, 405; 427/212, 427/216, 219
See application file for complete search history.

(56) References Cited

U.S. PATENT DOCUMENTS

| | | | | |
|---|---|---|---|---|
| 3,940,432 | A * | 2/1976 | Walker et al. | 518/701 |
| 4,594,181 | A * | 6/1986 | Siuta | 252/512 |
| 4,873,022 | A * | 10/1989 | Ogawa et al. | 428/209 |
| 5,068,150 | A * | 11/1991 | Nakamura et al. | 428/407 |
| 5,073,409 | A * | 12/1991 | Anderson et al. | 427/217 |
| 5,126,915 | A * | 6/1992 | Pepin et al. | 361/304 |

(Continued)

FOREIGN PATENT DOCUMENTS

JP 62-109906 * 5/1987

(Continued)

OTHER PUBLICATIONS

Patterson, "Silica introduction," Kirk-Othmer Encyclopedia of Chemical Technology, pp. 1-8, Dec. 4, 2000.*

(Continued)

*Primary Examiner*—Stanley S. Silverman
*Assistant Examiner*—Kallambella Vijayakumar
(74) *Attorney, Agent, or Firm*—Clark & Brody

(57) ABSTRACT

A highly oxidation-resistant copper powder for conductive paste, which is a copper powder containing not more than 5 wt % of Si, is characterized in that substantially all of the Si is adhered to the surfaces of the copper particles as $SiO_2$-system gel coating film.

1 Claim, 10 Drawing Sheets

U.S. PATENT DOCUMENTS

| | | | | |
|---|---|---|---|---|
| 5,332,596 | A | 7/1994 | Tani et al. | |
| 5,981,069 | A | 11/1999 | Tani et al. | |
| 6,136,083 | A * | 10/2000 | Schmidt et al. | 106/403 |
| 6,207,280 | B1 * | 3/2001 | Atarashi et al. | 428/403 |

FOREIGN PATENT DOCUMENTS

| | | | |
|---|---|---|---|
| JP | 3-68702 | | 2/1991 |
| JP | 03-068702 | * | 3/1991 |
| JP | 04-190502 | * | 7/1992 |
| JP | 2000-345201 | * | 12/2000 |
| JP | 2000345201 | | 12/2000 |

OTHER PUBLICATIONS

"The Electromagnetic Spectrum", NASA, 2006, pp. 1-5.*

* cited by examiner

HIGHLY OXIDATION-RESISTANT COPPER POWDER FOR CONDUCTIVE PASTE AND PROCESS FOR PRODUCING THE POWDER

TECHNICAL FIELD

This invention relates to a highly oxidation-resistant copper powder for use as an electrically conductive filler in a conductive paste.

BACKGROUND ART

Conductive pastes are frequently used as means for forming conductive circuitry and electrodes at the surface, interior or exterior of various substrates. In this specification, the term “conductive paste” indicates a fluid possessing fluidity that is generally obtained by dispersing a conductive powder as a filler (hereinafter called a “conductive filler”) in a vehicle composed of a resinous binder and a solvent and that when heated to an appropriate temperature undergoes vaporization/decomposition of the vehicle and sintering of the remaining conductive filler into a body constituting a good conductor of electricity. In other words, a paste that forms a conductor when sintered at high temperature is called a conductive paste for short. In actual use, such a conductive paste is applied to the surface or charged into an interior opening of a substrate and is subjected to a suitable heat treatment together with the substrate. The heat treatment vaporizes, decomposes and burns the vehicle, and the particles of the metallic powder constituting the conductive filler are sintered together to form a circuit capable of passing electricity. Likewise in the case of a laminated ceramic capacitor, conductive paste for the internal electrodes is interposed among a large number of ceramic substrates, conductive paste for the external electrodes interconnecting-the internal electrodes is applied, and heat treatment is similarly conducted to vaporize, decompose and remove the vehicle and sinter the metallic powder to form internal electrodes and external electrodes. At this time, the internal electrodes and external electrode are usually separately sintered.

The conductive filler (metallic powder) used in such a conductive paste is ordinarily copper powder or silver powder. Conductive pastes using copper powder as the conductive filler (copper-system pastes) have recently come into wide general use for the reason that, in comparison with conductive pastes using silver powder as the conductive filler (silver-system pastes), they are less susceptible to migration, superior in soldering resistance and able to achieve low cost. A copper-system paste with these merits is obtained by dispersing copper powder of a particle diameter of around 0.1-10 μm in an appropriate vehicle (usually composed of resin binder and a solvent).

Even among copper-system pastes, in the case of those used for the external electrodes of laminated ceramic capacitors and those for forming various circuitry on substrates, the physical and chemical properties required of the conductive paste differ with difference in electrode or circuit form, method of forming the same, substrate material, and the like. Since the general practice has therefore been to prepare copper-system pastes with various capabilities separately for each use, differences in the optimum range of coating conditions and sintering conditions are present among the individual types of copper-system pastes.

Except in certain special cases, a copper-system paste is usually desired to be sinterable at low temperature. This is because when conductive circuitry can be sintered by low temperature heating at the substrate surface and interior, the temperature to which the substrate heated together with the conductive paste is raised can be kept down to mitigate heat-related effects on the substrate, advantages can be enjoyed from the aspects of heat energy and equipment, and occurrence of strain owing to difference in thermal expansion between the ceramic substrate and copper circuitry can be reduced.

PROBLEMS TO BE OVERCOME BY THE INVENTION

When an electrode is formed by applying copper-system paste to a chip component such as a laminated ceramic capacitor and then sintering the copper powder in the paste by heating, the heating treatment is carried out in an inert gas (ordinarily nitrogen gas). Sometimes, however, a small amount of oxygen is mixed into the inert gas. In this case the copper powder surface is oxidized.

Specifically, the sintering passes through the stages of first vaporizing the resin and solvent in the paste (debindering step) and then sintering the remaining copper powder at the surface or interior of the substrate (sintering step). When decomposition products of the resin and/or solvent in the paste (carbonaceous components) remain at the debindering step, the sinterability of the copper powder in the following sintering step is degraded. An oxidation/debindering treatment is therefore sometimes conducted that involves mixing a small amount of oxygen into the inert gas atmosphere in the debindering step so that this oxygen will burn off of the carbonaceous components and promote the decomposition reactions. Part of the copper powder may be oxidized at this time.

When the copper powder is oxidized, the particle surfaces become coated with copper oxide that affects the sinterability and also increases the electrical resistance of the conductor after sintering. Unless special circumstances are present, therefore, oxidation of the copper powder in the debindering step is undesirable. Still, some degree of oxidation by addition of oxygen in the debindering step has to be tolerated owing to the adverse effect of residual carbonaceous components. In view of this, the debindering step is sometimes followed by heating in a reducing gas atmosphere such as of nitrogen and hydrogen so as to reduce the oxidized copper.

As the establishment of this reducing treatment increases in the number of processing steps and amount of equipment required, it adds to cost from the aspects of both expense and equipment. In addition, the reducing treatment is liable to partially reduce the ceramic. The best solution is therefore for the copper powder not to be oxidized in the debindering step. For this there is required a copper powder that is excellent in high-temperature oxidation resistance.

The object of the present invention is to provide a copper powder satisfying this requirement. On the other hand, a copper powder that is good in high-temperature oxidation resistance may also have a high sintering start temperature. Another object of the present invention is therefore to provide a metallic filler for conductive paste that has a low sintering start temperature despite having good high-temperature oxidation resistance.

DISCLOSURE OF THE INVENTION

As a copper powder that achieves the foregoing objects, the present invention provides a highly oxidation-resistant copper powder for conductive paste, which is a copper powder containing not more than 5 wt % of Si, characterized in that substantially all of the Si is adhered to the surfaces of the copper particles as an $SiO_2$-system gel coating film. This copper powder is, for example, one having an $SiO_2$-system gel coating film of not greater than 200 nm thickness formed uniformly (with, for example, a range of thickness variation within ±30%) on the surfaces of copper powder particles having an average particle diameter of, for example, not greater than 10 μm. The copper particles may be spherical or, otherwise, be plate-like or flake-like. Optionally, the $SiO_2$-system gel coating film may contain a metal oxide other than $SiO_2$ at an atomic ratio M/Si (M representing the metal component of the metal oxide) in the range of not greater than 1.0. M can be one or more selected from the group of Na, K, B, Pb, Zn, Al, Zr, Bi, Ti, Mg, Ca, Sr, Ba and Li. Further, the $SiO_2$-system gel coating film can be one adhering to the surfaces of copper particles having been initially formed with a coating composed of an organic compound. The present invention also provides a highly oxidation-resistant and sinterable copper powder for conductive paste obtained blending not more than 10 parts by weight of glass frit with 100 parts by weight of highly oxidation-resistant copper powder having said $SiO_2$-system gel coating film.

The copper powder having such an $SiO_2$-system gel coating film can be advantageously produced by a wet process of reacting copper powder, an organosilane compound and water in a water-soluble organic solvent to generate a hydrolysate product of organosilane, adding a gelling agent to the suspension obtained to form an $SiO_2$-system gel coating film on surfaces of the copper powder particles, preferably under application of physical mixing and ultrasonic waves, and then harvesting copper particles having the $SiO_2$-system gel coating film by solid-liquid separation. Aqueous ammonia can be advantageously utilized as the gelling agent.

PREFERRED EMBODIMENTS OF THE INVENTION

Figure 1:
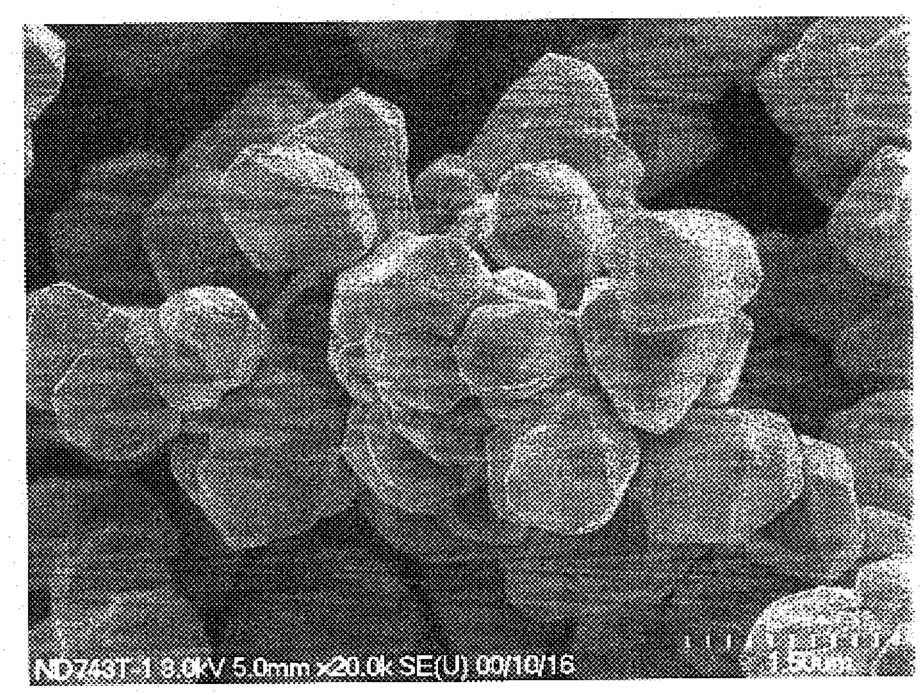
FIG. 1 is an SEM image (scanning electron micrograph) of a copper powder specimen used to form an $SiO_2$-system gel coating film.

In order to achieve the foregoing objects, the inventors tried various ways of coating copper powder surfaces with metal oxide, focusing particularly on the sol-gel method. As a result we discovered that by adhering a very thin layer of a hydrolysate product derived from an organosilane compound to the surfaces of copper particles by siloxane binding and then conducting condensation reaction with a catalyst or the like it becomes possible to produce a uniform and very thin $SiO_2$-system gel coating film on the surfaces of copper particles by a wet process. We further learned that the oxidation start temperature of the copper powder having the $SiO_2$-system gel coating film obtained in this manner is about 120-200° C. higher than copper powder without the coating film and that its sintering start temperature also changes.

That is to say, when a copper powder of an average particle diameter of not greater than 10 μm is suspended in an organic solvent and a sol-gel reaction that hydrolyzes-condensates an organosilane compound is allowed to proceed at the copper particle surfaces, a uniform $SiO_2$-system gel coating film is formed to a thickness of not greater than 100 nm, preferably 10- 60 nm. Specifically, in order to conduct the sol hydrolysis, the copper powder, organosilane compound and water are reacted in a water-soluble organic solvent such as isopropyl alcohol.

So that the organic solvent can function as a sol medium that promotes the hydrolysis, it is preferably one that can dissolve water. It is, for instance, preferably one whose water solubility at 20° C. is 10 wt % or greater. As organic solvents meeting this description can be used methyl alcohol, ethyl alcohol, isopropyl alcohol, acetone, methyl ethyl ketone, tetrahydroftiran, dioxolane, dioxane and the like.

Suitable organosilanes are, for example, alkoxysilanes represented by the general formula $R^1_{4-\alpha}Si(OR^2)_\alpha$ (where $R^1$ is a monovalent hydrocarbon group, $R^2$ is a monovalent hydrocarbon with a carbon number of 1-4, and α is 3-4). Typical ones include tetraethoxysilane and methyltrimethoxysilane.

In order to conduct the hydrolysis reaction of the alkoxysilane at the copper powder surface in the organic solvent, the copper powder is first suspended in the organic solvent by stirring,- the alkoxysilane is added to the suspension, and then water (pure water) for participation in the hydrolysis is added (or the alkoxysilane is added after the pure water). After this sequence of procedures, it suffices to add an alkali catalyst for promoting the hydrolysis-condensation reaction, e.g., aqueous ammonia. As a result, the alkoxysilane first adheres to the copper powder particle surfaces by siloxane binding, and this alkoxysilane hydrolyzes at the copper powder particle surfaces and undergoes condensation reaction (gels) to form a uniform $SiO_2$-system coating on the copper particle surfaces.

Although an acid or alkali is generally used to catalyze a sol-gel reaction, the inventors found that ammonia is the most suitable catalyst when forming an $SiO_2$-system gel coating film on the copper powder particle surfaces. A gel coating film with adequate oxidation resistance cannot be obtained with an acid such as hydrochloric acid, sulfuric acid or phosphoric acid. When an alkali such as sodium hydroxide or potassium hydroxide is used, sodium or potassium undesirable as a material of electronic components remains in the copper powder as an impurity and, by extension, also remains in the conductive paste. Moreover, use of an amine-system catalyst like diethylamine or triethylamine is undesirable owing to problems encountered in the addition operation. These include, for example, erosion of the resin tube used for the addition. In contrast, use of ammonia makes it possible to obtain a gel coating film having good oxidation resistance property, while also offering merits such as ready availability, low cost, simple removal by vaporization and no residual impurities.

After addition of the aqueous ammonia, the condensation reaction is preferably allowed to proceed by ripening at a prescribed temperature for a prescribed time. For example, it is preferable to maintain the slurry temperature at 20-60° C. for a prescribed period. The thickness of the $SiO_2$-system gel coating film depends generally on the amount of alkoxysilane, the slurry temperature, holding time and other such factors. By regulating these, a thin $SiO_2$-system gel coating film of uniform thickness can be formed on the copper particle surfaces. It was found that at this time the shape of the copper powder particles has substantially no effect on the coating film thickness, so that an $SiO_2$-system gel coating film of uniform thickness can be formed on copper particles of any shape, including spherical, plate-like, flake-like (foil-like) and angular. It was further found that when an ammonia catalyst is used, agglomeration of the copper powder particles with $SiO_2$-system gel coating film can be prevented by continuous addition of the ammonia catalyst to the reaction system. Even if the particles agglomerate, they can be readily dispersed at least to around the degree of dispersion of the starting copper powder by applying ultrasonic waves to the reaction system.

In this manner, an $SiO_2$-system gel coating film of uniform thickness can be formed on the copper powder particle surfaces. When the amount of the $SiO_2$ comes to exceed 10 wt % relative to the copper, however, the effect on conductivity becomes pronounced. An amount not exceeding this level is therefore desirable and, in terms of Si amount, is preferably not greater than 5 wt %. In other words, it is preferable for the copper powder to contain not greater than 5% of Si and for substantially all of the Si to be adhered to the copper particle surfaces as $SiO_2$-system gel coating film. By "substantially" all of the Si is meant that a small amount of Si unavoidably remaining in the coating film in a form other than $SiO_2$ is tolerable. For example, even if, owing to production-related causes, part of the Si unavoidably remains in the coating film as an alkoxysilane residual or a small amount remains as an Si oxide other than $SiO_2$, it will exert no particularly unfavorable effect insofar as the amount is slight.

By making another metallic alkoxide such as Na, K or B alkoxide present in the reaction system in addition to the alkoxysilane used it is possible to form a composite gel coating film in which $Na_2O$, $K_2O$ or $B_2O_3$ or the like is co-present with the $SiO_2$. This also enables an improvement in the oxidation resistance of the copper powder and makes it possible to control the sintering properties (particularly the sintering start temperature) of the copper powder by regulating the amount of these metal oxides. The content of these other metal oxides should be controlled to within an atomic ratio M/Si (M representing the metal component of the metal oxide) in the range of not greater than 1.0. At a higher ratio than this, the uniformity and oxidation resistance property of the coating may be impaired. As M can be used not only the aforesaid Na, K and B but also one or more selected from the group of Pb, Zn, Al, Zr, Bi, Ti, Mg, Ca, Sr, Ba and Li.

After the $SiO_2$-system gel coating film has been formed on the surfaces of the copper powder particles by the aforesaid wet process using the sol-gel process, it suffices to harvest the copper powder with $SiO_2$-system gel coating film by solid-liquid separation and to dry the harvested copper powder. If the dried product agglomerates like cake, well-dispersed copper powder with $SiO_2$-system gel coating film can be obtained by pulverizing the cake using a sample mill or the like. The copper powder with adhered gel coating film can be used as filler for conductive paste without further treatment. That is, the copper powder can, as it is with the gel coating film intact, be made into a conductive paste by blending with a resin binder and solvent, without need for any particular heat treatment.

The copper powder with adhered $SiO_2$-system gel coating film according to the present invention has better oxidation resistance than one without the $SiO_2$-system gel coating film and is also changed in sintering start temperature. As pointed out in the Examples set out later, these facts were ascertained by thermogravimetry and sinterability tests. Improved copper powder oxidation resistance is highly advantageous because, as pointed out earlier, when copper powder is used as the conductive filler of a conductive paste oxidization can be prevented in the debindering step. In addition, the sintering start temperature becomes high in the case of an $SiO_2$-system gel coating film not containing the aforesaid M element(s).

Excessive rise in the sintering temperature is, however, not desirable. It was found that in the present invention this problem can be overcome by making an oxide of an aforesaid M element such as Na, K or B co-present in the $SiO_2$-system gel coating film or by adding a suitable amount of glass frit to the copper powder with $SiO_2$-system gel coating film. In the latter case, the sintering start temperature can be lowered by blending in a suitable amount of glass frit containing a metal oxide component such as $SiO_2$, $Na_2O$, $B_2O_3$ or PbO. This is thought to be because these metal oxides react with the $SiO_2$-system gel coating film on the copper powder particle surfaces to produce a low-melting-point glassy material that promotes sintering among the particles.

Since the glass frit affects the conductive property of the conductive filler when incorporated excessively, the amount thereof should be set at that required for reaction with the $SiO_2$-system gel coating film within the range of not greater than 10 parts by weight, preferably not greater than 7 parts by weight, with respect to 100 parts by weight of the copper powder with adhered $SiO_2$-system gel coating film.

The copper powder to be formed on its particle surfaces with the $SiO_2$-system gel coating film in accordance with the present invention (the copper powder to be treated) can be either copper powder manufactured by the wet reduction process or copper powder manufactured by atomization process. In other words, the invention does not limit the copper powder by production process and can be applied to copper powder obtained by any production process. Still, when copper powder is produced by the wet reduction process in which it proceeds through the transformation of copper hydroxide→copper oxide→metallic copper, copper powders with various grain size distribution can be obtained relatively easily, while spherical or plate-like powders can also be obtained with relative ease. It was found that when the hexagonal plate-like copper powder taught by JPA11-350009 (1999), for example, is used as the copper powder to be treated of the present invention and an $SiO_2$-system gel coating film is adhered to the particles thereof, the improvement in oxidation resistance is particularly good and the sintering temperature also becomes high. This is considered to be because the hexagonal plate-like copper powder has good crystallinity. An interesting phenomenon of the shape retaining performance during the sintering process being high was also noted.

Good shape retaining performance in the sintering step works favorably from the viewpoint of the conductive paste. Specifically, in the step of sintering an applied conductive paste, dispersion among the filler particles and material migration sometimes occurs to locally decrease film thickness, produce voids and give rise to dripping, thus deforming the three-dimensional shape of the formed conductor. Low susceptibility to three-dimensional shape deformation, i.e., resistance of the three-dimensional shape of the conductive paste to deformation, is called "steric hindrance property". The product obtained by imparting $SiO_2$-system gel coating film to the aforesaid hexagonal plate-like copper powder can make a conductive paste with good steric hindrance property because it exhibits high shape retaining performance in the sintering step.

The aim of obtaining a conductive paste with still better steric hindrance property can be achieved by blending an appropriate amount of a product obtained by imparting $SiO_2$-system gel coating film to a flake-like powder with a product obtained by imparting $SiO_2$-system gel coating film to a spherical powder or a plate-like powder. A flake like copper powder is here defined as a copper powder composed of copper particles whose thickness is not greater than 1/10, preferably not greater than 1/100, and in some cases not greater than 1/1000, the major axis of the broad surface side and whose average major axis of the broad surface side is not greater than around 40 μm. More specifically, it is a copper powder composed of foil-like copper particles of an average thickness of not greater than 100 nm and average major axis of around 5-40 μm. Although the large specific surface area of flake-like copper powder makes it more susceptible to oxidation than a spherical powder, it can be made oxidation resistant by imparting it with $SiO_2$-system gel coating film. A conductive paste made using a filler prepared by blending a suitable amount of a product obtained by imparting $SiO_2$-system gel coating film to flake-like copper powder with a product obtained by imparting $SiO_2$-system gel coating film to spherical powder or plate-like powder was found to have markedly enhanced steric hindrance property, presumably because during the sintering step the spherical or plate-like powder particles interact as barriers that limit material migration. However, when a product obtained by imparting $SiO_2$-system gel coating film to flake-like copper powder is used alone as filler, a good conductive paste may not always be obtainable owing to the fact that chargeability into the resin binder decreases. The preferable blending rate is in the range of 1-80 parts by weight of the product obtained by imparting $SiO_2$-system gel coating film to flake-like copper powder to 100 parts by weight of the product obtained by imparting $SiO_2$-system gel coating film to spherical and/or plate-like copper powder.

It was found that even when a hexagonal plate-like copper powder or a flake-like copper powder is used as the copper powder to be treated, the present invention enables homogeneous adhesion of uniform $SiO_2$-system gel coating film of not greater than 200 nm to the particle surfaces thereof (see FIGS. 7 and 8 and FIGS. 9 and 10 discussed later). It was clarified that a certain correlation exists between the thickness of the $SiO_2$-system gel coating film and the amount of added metallic alkoxide for each copper powder particle shape. By regulating the amount added metallic alkoxide utilizing this correlation, the film thickness can be accurately controlled to within the range of not greater than 200 nm, preferably 5-80 nm.

In order to prevent oxidation of the particle surfaces of the copper powder to be treated up to impartation of the $SiO_2$-system gel coating film to the copper powder to be treated, it is advantageous to impart an organic coating for oxidation prevention thereto. Specifically, the copper powder particle surfaces are preferably imparted with an organic acid-system coating such as oleic acid or stearic acid so as to impart the copper powder to be treated with oxidation resistance in the vicinity of room temperature or ensure dispersibility in the treatment solution. Even when a copper powder imparted with such an organic acid-system coating is used as the copper powder to be treated, $SiO_2$-system gel coating film can be formed by the same treatment as in the case of a copper powder without the coating. While it was expected that the intervention of the organic acid-system coating would hinder the reaction with the alkoxide, it instead turned out that the $SiO_2$-system gel coating film could be formed in good order with the coating intact.

It should be noted that there is no need for a treatment for vitrifying the $SiO_2$-system gel coating film on the copper powder particle surfaces. Although the $SiO_2$-system gel coating film can be vitrified by heating to a certain temperature higher than 200° C., the gel coating achieves oxidation resistance fully adequate for the requirements of a conductive paste even without conducting such heat treatment for vitrification. Heat treatment for vitrification is undesirable in the present invention because it produces cracks in the coating film and contracts the gel coating to expose the surfaces of the copper particles and, by these actions, impairs the oxidation resistance and has an adverse effect on the sintering properties.

EXAMPLES

Example 1

As a specimen was used copper powder with an average grain diameter of 1.5 μm that had a grain distribution of D10=1.7 μm, D50=2.5 μm and D90=3.8 μm as determined by grain size distribution measurement using a laser-scattering and diffraction grain size distribution analyzer manufactured by Beckman Coulter. The average grain diameter is the value measured using a sub-sieve sizer manufactured by Fischer. D10, D50 and D90 are values of particle diameter D corresponding to Q%=10%, 50% and 90% on a cumulative particle-size curve plotted in an orthogonal coordinate system whose abcsissa represents particle diameter D (μm) and ordinate represents volume Q % of particles with particle diameters not greater than D μm present. The specimen copper powder was produced by the wet reduction process and, as seen the SEM image of FIG. 1, had a substantially spherical particle shape.

The specimen copper powder (Cu: 3.15 mole equivalent) was added to isopropyl alcohol to prepare a slurry having a copper concentration of 28.6 wt. % that was maintained at 40° C. under stirring in a nitrogen atmosphere while being added with an amount of tetraethoxysilane for bringing the Cu/[$Si(OC_2H_5)_4$] mole ratio to 33 and then an amount of pure water for bringing the $H_2O$/[$Si(OC_2H_5)_4$] mole ratio to 25. Then, an amount of aqueous ammonia for bringing the [$NH_3$]/[$Si(OC_2H_5)_4$] mole ratio to 7.0 was added to the slurry at a constant rate of addition over 35 minutes using a roller pump. The slurry was then ripened for 60 minutes at 40° C. in the nitrogen atmosphere under continued stirring.

Figure 2:
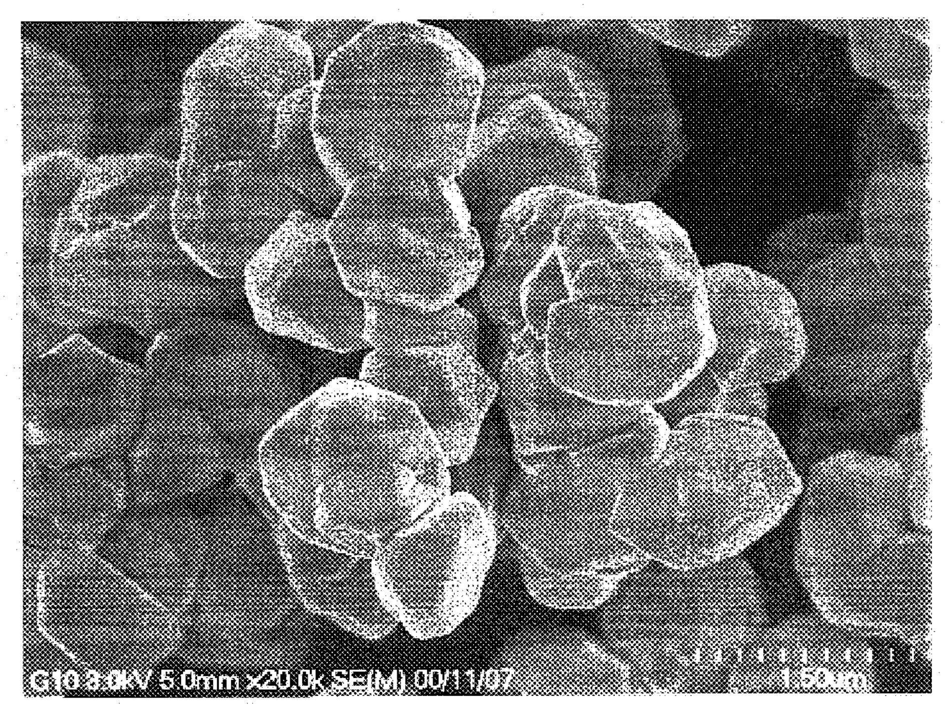
FIG. 2 is an SEM image of the copper powder of FIG. 1 after being formed with an $SiO_2$-system gel coating film.
Figure 3:
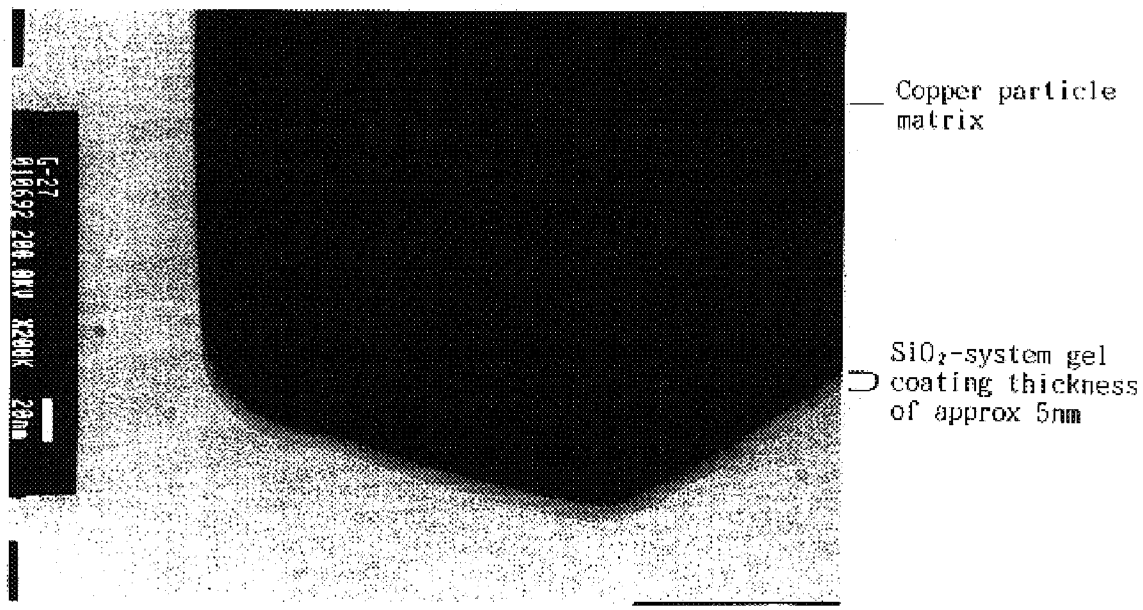
FIG. 3 is a TEM image (transmission electron micrograph) of a surface portion of a single particle of copper with the $SiO_2$-system gel coating film of FIG. 2.

The obtained suspension was filtered and the filtered-off powder was without washing charged into a drying furnace to be dried for 11 hours at 120° C. in a nitrogen atmosphere. The dried product was observed using an SEM. From the obtained image shown in FIG. 2, it was found to consist of spherical particles of approximately the same diameter as the specimen shown in FIG. 1. Further observation of a surface portion in a high-magnification TEM image revealed that, as shown in FIG. 3, a uniform $SiO_2$-system gel coating film of about 5 nm thickness was formed.

The obtained powder was chemically analyzed and its oxidation start temperature and sintering start temperature were measured. The results are shown in Table 1. Measurement of oxidation start temperature was conducted in air using a thermogravimeter (TG). Oxidation start temperature was defined as "temperature when the weight of the sample copper powder in the thermogravimeter had increased 0.5% from the initial value." Sintering start temperature was measured as explained in the following.

Sintering start temperature measurement: A 1 g sample of the copper was taken for measurement. To this was added 0.03-0.05 g of an organic vehicle (ethyl cellulose or acryl resin diluted with a solvent; in this example, ethyl cellulose was used) and the result was blended in an agate mortar for about 5 minutes. The mixture was charged into a 5-mm diameter cylindrical shell and formed into a cylinder measuring about 10 mm in height by maintaining it under a pressure of 1,623N for 10 seconds by the force of a punch pressed down from above. The formed body was stood in a heat riser in a state applied with a load of 10 g in the vertical direction and heated in a nitrogen gas stream at a temperature increase rate of 10° C./min to continuously raise its temperature over the measurement range of room temperature to 1,000° C. Change in the formed body height (change owing to expansion or contraction) was automatically recorded over the course of the heating. The temperature after the height of the formed body started to change (contract) at which the percentage of contraction reached 0.5% was defined as the "sintering start temperature." The automatic recording of height change was conducted by plotting a curve, called the TMA curve, in an orthogonal coordinate system whose abscissa was scaled for increasing temperature (proportional to elapsed time in the case of a constant temperature increase rate) and whose ordinate was scaled for percentage of height change (percentage of expansion or contraction).

The results obtained when a copper powder without $SiO_2$-system gel coating film (Control 1) was subjected to the same tests are also shown in Table 1 for comparison.

As can be seen from the results in Table 1, the $SiO_2$-system gel coating film of the copper powder formed with $SiO_2$-system gel coating film of this Example had an Si content of 0.77%. While its average particle diameter was on the same order as that of Control 1, its particle size distribution was somewhat shifted toward the D50, D90 side (local agglomeration occurred). However, its oxidation start temperature was 308° C., a markedly higher than th 165° C. of Control 1. The sintering start temperature also increased, from 716° C. to 973° C.

Example 2

The process of Example 1 was repeated except that, instead of solely adding tetraethoxysilane, an amount of tetraethoxysilane was added to bring the $Cu/[Si(OC_2H_5)_4]$ mole ratio to 33 and an amount of boron alkoxide ($B_2O_3$ dissolved in isopropyl alcohol) was added to bring the $Cu/[B(OC_3H_7)_3]$ mole ratio to 55, thereby producing a copper powder having an $SiO_2$-system gel coating film containing $B_2O_3$. In the course of the process, pure water was added to bring the mole ratio of $H_2O$ to the total of the two alkoxides to 25. The obtained copper powder with gel coating film was subjected to the same tests as in Example 1. The results are shown in Table 1.

As can be seen from the results in Table 1, the copper powder having $SiO_2$-system gel coating film containing $B_2O_3$ of this Example had a still further improved oxidation start temperature of 318° C., while its sintering start temperature was lower than that of the control starting powder, at 679° C.

Example 3

The process of Example 1 was repeated except that, instead of solely adding tetraethoxysilane, an amount of tetraethoxysilane was added to bring the $Cu/[Si(OC_2H_5)_4]$ mole ratio to 33 and an amount of sodium alkoxide (NaOH dissolved in isopropyl alcohol) was added to bring the $Cu/[Na(OC_3H_7)]$ mole ratio to 132, thereby producing a copper powder having an $SiO_2$-system gel coating film containing $Na_2O$. In the course of the process, pure water was added to bring the $H_2O/[Si(OC_2H_5)_4]$ mole ratio to 15. The obtained copper powder with gel coating film was subjected to the same tests as in Example 1. The results are shown in Table 1.

As can be seen from the results in Table 1, the copper powder having $SiO_2$-system gel coating film containing $Na_2O$ of this Example had an oxidation start temperature of 262° C. and a sintering start temperature of 569° C., lower than that of the control starting powder.

Example 4

The process of Example 1 was repeated except that the slurry was irradiated with ultrasonic waves from the stage of slurry formation through completion of ripening. The copper powder with $SiO_2$-system gel coating film obtained was subjected to the same tests as in Example 1. The results are shown in Table 2. Owing to the ultrasonic wave irradiation, the obtained copper powder with $SiO_2$ coating had a grain size distribution similar to that of the starting powder.

Example 5

The process of Example 4 was repeated except that the total amount of aqueous ammonia was added at one time. The copper powder with $SiO_2$-system gel coating film obtained was subjected to the same tests as in Example 1. The results are shown in Table 2. Despite the addition of the aqueous ammonia in a single lot, agglomeration was avoided thanks to the irradiation with ultrasonic waves. Although the grain size distribution of the obtained copper powder with $SiO_2$ coating did not reach the Example 4 level, it was closer to that of the starting powder than was that of Example 1.

Example 6

Figure 4:
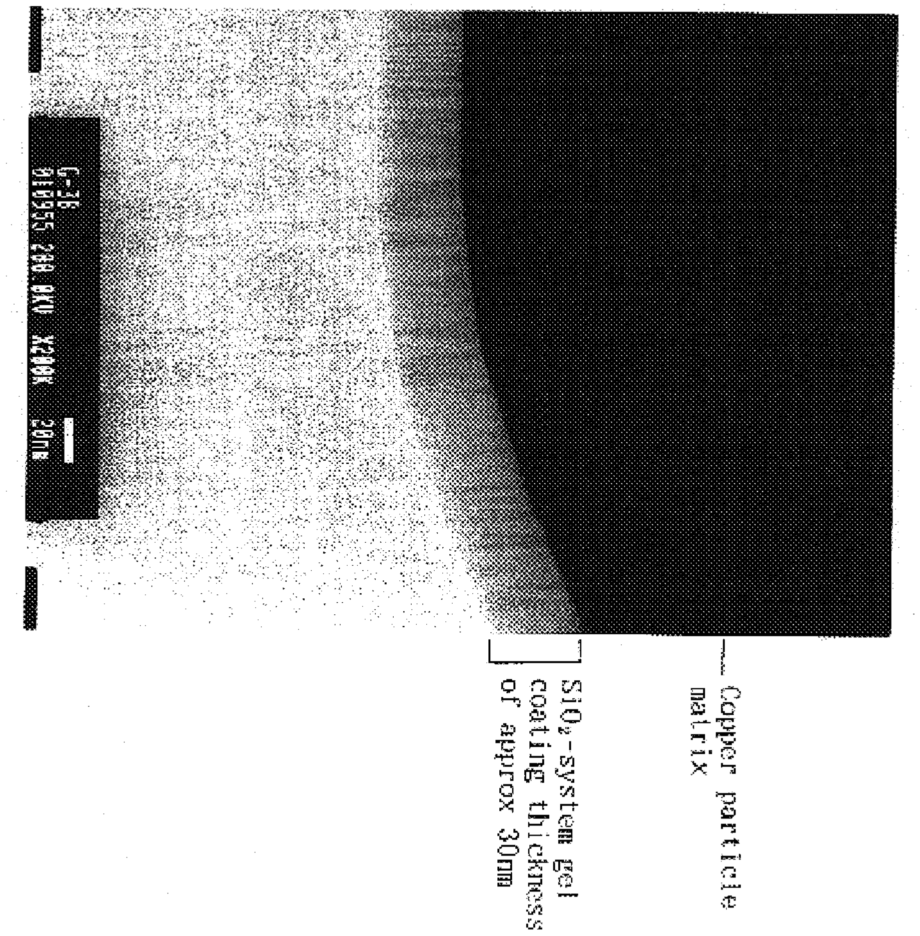
FIG. 4 is a TEM image of a surface portion of a single particle of copper with another $SiO_2$-system gel coating film.

The process of Example 1 was repeated except that a specimen powder having an average particle diameter of 3.5 μm was used. The copper powder with $SiO_2$-system gel coating film obtained was subjected to the same tests as in Example 1. The results are shown in Table 3. The oxidation start temperature rose to 360° C. FIG. 4 is a TEM image of the obtained copper powder with $SiO_2$-system gel coating film. As can be seen in FIG. 4, a uniform $SiO_2$-system gel coating film of about 30 nm thickness was formed.

Example 7

The process of Example 6 was repeated except that the dried product was disintegrated in a sample mill. The copper powder with $SiO_2$-system gel coating film obtained was subjected to the same tests as in Example 1. The results are shown in Table 3. The grain size distribution was closer to the starting powder than that of Example 6 and a product composed of discretely dispersed particles was obtained. Despite the fact that the particles were discretely dispersed, the oxidation start temperature was a high 352° C. and it was ascertained that each particle was formed with a uniform $SiO_2$-system gel coating film.

The results obtained when the starting copper powder specimen used in Examples 6 and 7 (copper powder without $SiO_2$-system gel coating film) (Control 2) was subjected to the same test are also shown in Table 3 for comparison.

TABLE 1

| | $SiO_2$ coating | Powder chemical composition (wt %) | | | | | Ave. particle diameter | Grain size distribution (μm) | | | Oxidation start temp. | Sintering start temp. |
|---|---|---|---|---|---|---|---|---|---|---|---|---|
| No | type | Si | B | Na | O | Cu | (μm) | D10 | D50 | D90 | (° C.) | (° C.) |
| Control 1 | No coating | <0.01 | <0.01 | <0.01 | 0.16 | Balance | 1.5 | 1.7 | 2.5 | 3.8 | 165 | 716 |
| Example 1 | $SiO_2$ only | 0.77 | <0.01 | <0.01 | 1.33 | Balance | 1.5 | 4.0 | 6.8 | 10.3 | 308 | 973 |
| Example 2 | $SiO_2 + B_2O_3$ | 0.51 | 0.19 | <0.01 | 1.52 | Balance | 1.5 | 3.8 | 7.4 | 11.9 | 318 | 679 |
| Example 3 | $SiO_2 + Na_2O$ | 0.48 | <0.01 | 0.28 | 0.99 | Balance | 1.5 | 3.1 | 7.0 | 12.3 | 262 | 569 |

TABLE 2

| | $SiO_2$ coating | Powder chemical composition (wt %) | | | | | Ave. particle diameter | Grain size distribution (μm) | | | Oxidation start temp. |
|---|---|---|---|---|---|---|---|---|---|---|---|
| No | type | Si | B | Na | O | Cu | (μm) | D10 | D50 | D90 | (° C.) |
| Example 4 | $SiO_2$ only | 0.54 | <0.01 | <0.01 | 0.99 | Balance | 1.5 | 1.7 | 2.5 | 3.8 | 309 |
| Example 5 | $SiO_2$ only | 0.58 | <0.01 | <0.01 | 1.03 | Balance | 1.5 | 1.9 | 3.0 | 4.4 | 307 |

TABLE 3

| | $SiO_2$ coating | Powder chemical composition (wt %) | | | | | Ave. particle diameter | Grain size distribution (μm) | | | Oxidation start |
|---|---|---|---|---|---|---|---|---|---|---|---|
| No | type | Si | B | Na | O | Cu | (μm) | D10 | D50 | D90 | temp. (° C.) |
| Example 6 | $SiO_2$ only | 0.86 | <0.01 | <0.01 | 1.27 | Balance | 3.5 | 7.7 | 12.2 | 17.0 | 360 |
| Example 7 | $SiO_2$ only | 0.86 | <0.01 | <0.01 | 1.27 | Balance | 3.5 | 3.0 | 3.6 | 4.5 | 352 |
| Control 2 | No coating | <0.01 | <0.01 | <0.01 | 0.15 | Balance | 3.5 | 3.0 | 3.6 | 4.3 | 192 |

Figure 5:
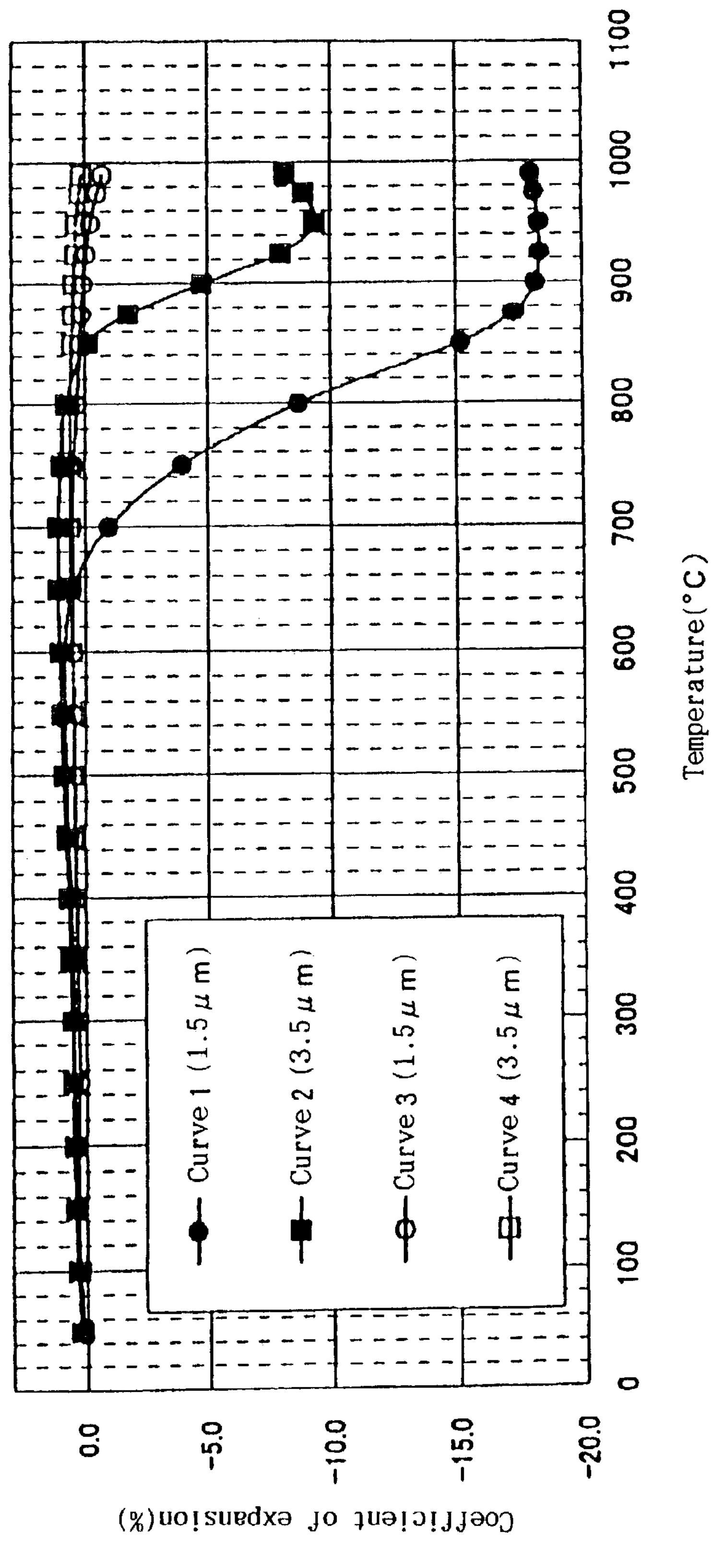
FIG. 5 is a graph comparing TMA curves determined for copper powders with and without $SiO_2$-system gel coating film.

FIG. 5 is a graph showing the TMA curves of typical copper powders among the foregoing Examples. All of the TMA curves were obtained using measurement specimens prepared using acryl resin as the organic vehicle for the copper powder specimen. An explanation of the curves of FIG. 5 follows.

Curve 1: TMA curve of copper powder without coating used as specimen in Examples 1-3 (Control 1 copper powder having average particle diameter of 1.5 μm); sintering start temperature of about 687° C.

Curve 2: TMA curve of copper powder without coating used as specimen in Examples 6 and 7 (Control 2 copper powder having average particle diameter of 3.5 μm); sintering start temperature of about 857° C.

Curve 3: TMA curve of copper powder with $SiO_2$-system gel coating film of Example 1; sintering start temperature of 973° C.

Curve 4: TMA curve of copper powder with $SiO_2$-system gel coating film of Example 7; sintering did not start up to 1,083° C., the melting point of copper.

Example 8

Figure 6:
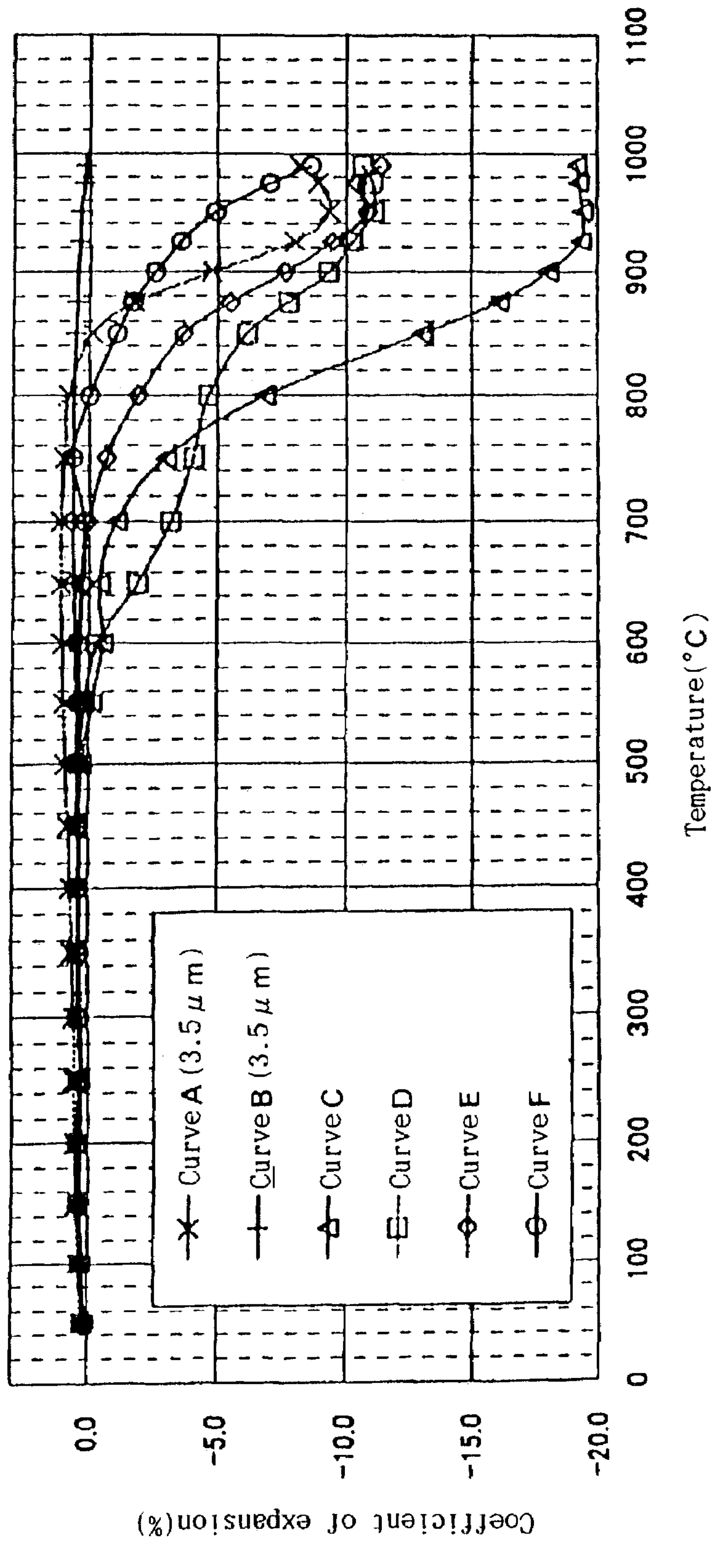
FIG. 6 is a graph comparing TMA curves of different mixed powders obtained by blending glass frit and copper powders having $SiO_2$-system gel coating film.

Blended powders were prepared by blending several glass frits with the copper powder with $SiO_2$-system gel coating film obtained in Example 6 at the rate of 5 wt % of glass frits and the TMA curves of the respective blended powders were determined. The results are shown in FIG. 6. The TMA curve of the copper powder with $SiO_2$-system gel coating film obtained in Example 6 alone (without addition of glass frit) and the TMA curve of the 3.5 μm average particle diameter copper powder without coating used as the specimen powder in Example 6 (without addition of glass frit) are also shown in FIG. 6 for comparison. All of the TMA curves were obtained using measurement specimens prepared using acryl resin as the organic vehicle for the copper powder specimen.

An explanation of the curves of FIG. 6 follows.

Curve A: TMA curve of 3.5 μm average particle diameter copper powder without coating used as the specimen powder in Example 6 (without addition of glass frit); sintering start temperature of about 857° C.

Curve B: TMA curve of of 3.5 μm average particle diameter copper powder with $SiO_2$-system gel coating film obtained in Example 6 (without addition of glass flit); did not sinter up to 1,083° C., the melting point of copper.

Curve C: TMA curve of blended powder obtained by adding 5 wt % of $B_2O_3$.ZnO.PbO-system glass frit to the copper powder with $SiO_2$-system gel coating film obtained in Example 6; sintering start temperature of about 672° C.

Curve D: TMA curve of blended powder obtained by adding 5 wt % of $SiO_2.B_2O_3$.ZnO-system glass frit to the copper powder with $SiO_2$-system gel coating film obtained in Example 6; sintering start temperature of about 606° C.

Curve E: TMA curve of blended powder obtained by adding 5 wt % of $B_2O_3$.ZnO-system glass frit to the copper powder with $SiO_2$-system gel coating film obtained in Example 6; sintering start temperature of about 741° C.

Curve F: TMA curve of blended powder obtained by adding 5 wt % of $SiO_2.B_2O_3$.PbO-system glass frit to the copper powder with $SiO_2$-system gel coating film obtained in Example 6; sintering start temperature of about 823° C.

As can be seen from the results in FIG. 6, the copper powders with $SiO_2$-system gel coating film had increased sintering start temperatures but when added with glass frit exhibited sintering start temperatures lower than that of the copper powder without $SiO_2$-system gel coating film, meaning that their oxidation resistance could be enhanced while lowering their sintering start temperatures.

Example 9

Figure 7:
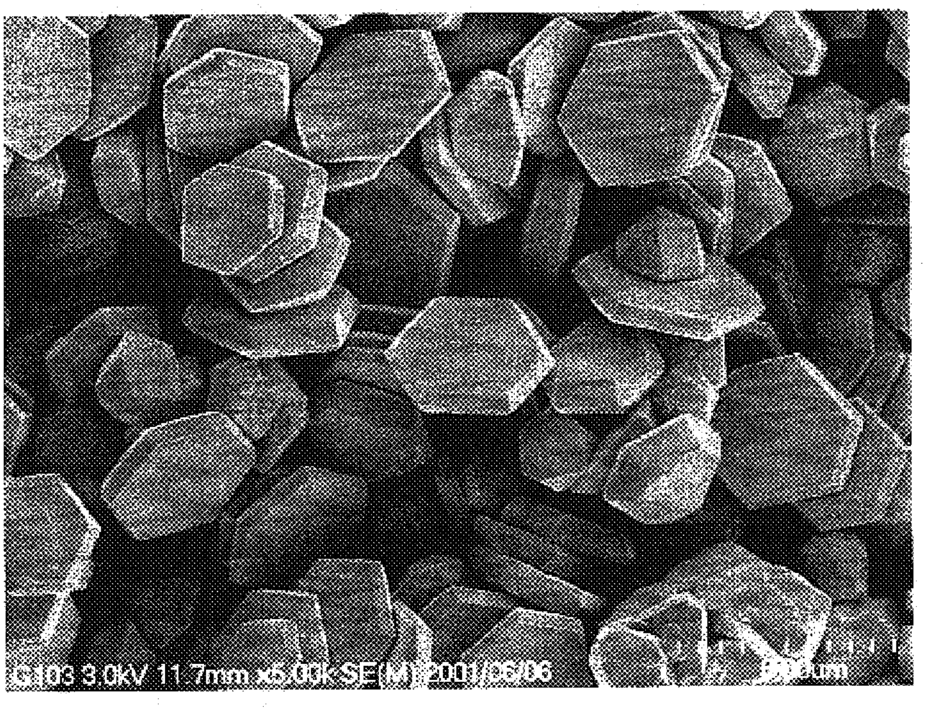
FIG. 7 is an SEM image of another copper powder specimen (hexagonal plate-like copper powder) used to form an $SiO_2$-system gel coating film.
Figure 8:
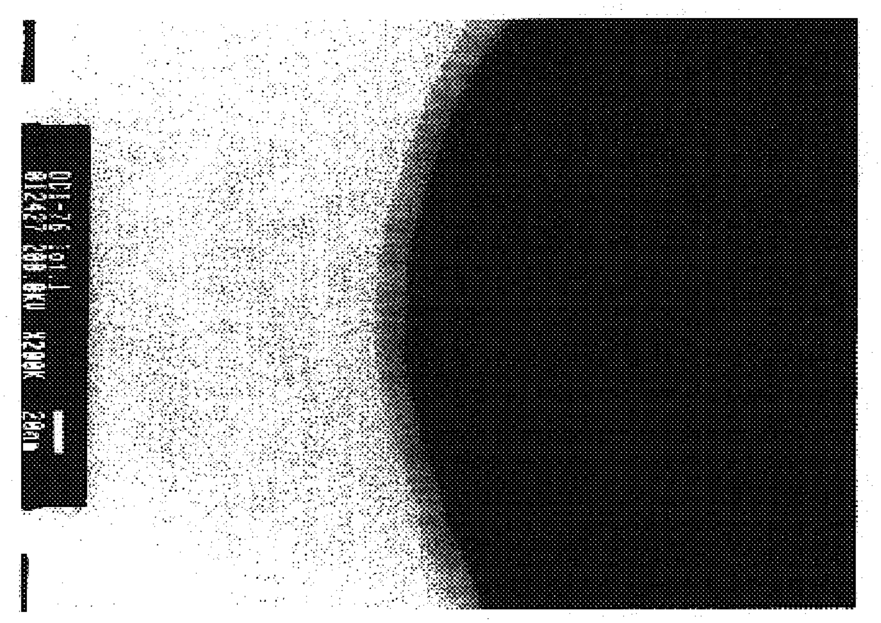
FIG. 8 is a TEM image of the hexagonal plate-like copper powder of FIG. 7 after being formed with an $SiO_2$-system gel coating film.

The process of Example 1 was repeated except that the powder specimen was a hexagonal plate-like copper powder with an average particle diameter of 3.5 μm and a grain size distribution of D10=3.0 μm, D50=4.1 μm and D90=5.5 μm. An SEM image (scanning electron microscope image) of the specimen copper powder is shown in FIG. 7. FIG. 8 shows a TEM image (transmission electron microscope image) of a single particle of the copper powder after being formed with an $SiO_2$-system gel coating film. As can be seen in FIG. 8, a gel coating film of about 20 nm thickness was uniformly adhered to the hexagonal plate-like particle surface.

The grain size distribution, composition and oxidation start temperature of the obtained copper powder with $SiO_2$-system gel coating film are shown in comparison with those of the specimen copper powder in Table 4. From the results in Table 4, it can be seen that, in contrast to the hexagonal plate-like copper powder, which had an oxidation start temperature of 201° C., the copper powder of this Example obtained by imparting an $SiO_2$-system gel coating film to the same exhibited superior oxidation resistance, with an oxidation start temperature of 343° C.

TABLE 4

| Hexagonal plate-like | Chemical composition (wt %) | | | Grain size distribution (μm) | | | Oxidation start temp. |
|---|---|---|---|---|---|---|---|
| copper powder | Si | O | Cu | D10 | D50 | D90 | (° C.) |
| Specimen (no coating) | <0.01 | 0.14 | Balance | 3.0 | 4.1 | 5.5 | 201 |
| With $SiO_2$-system coating | 0.52 | 0.92 | Balance | 4.1 | 6.1 | 8.7 | 343 |

Example 10

Figure 9:
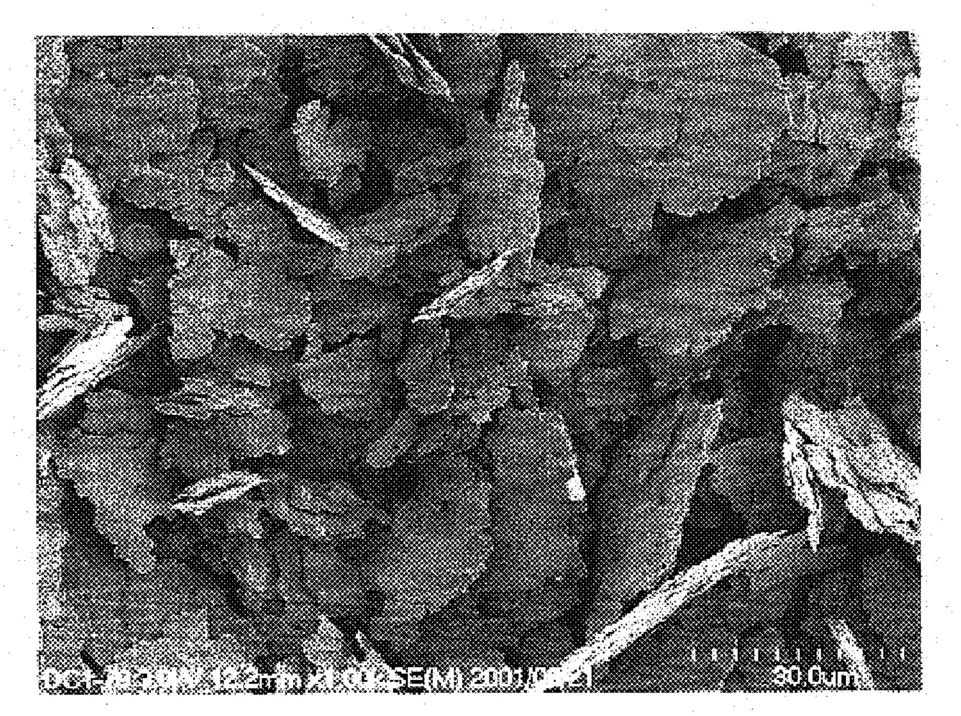
FIG. 9 is an SEM image of another copper powder specimen (flake-like copper powder) used to form an $SiO_2$-system gel coating film.
Figure 10:
FIG. 10 is a TEM image of the flake-like copper powder of FIG. 9 after being formed with an $SiO_2$-system gel coating film.

The process of Example 1 was repeated except that the powder specimen was a flake-like copper powder with an average particle diameter of about 30 μm and a grain size distribution of D10=8.0 μm, D50=17.2 μm and D90=42.9 μm. An SEM image (scanning electron microscope image) of the specimen copper powder is shown in FIG. 9. FIG. 10 shows TEM images (transmission electron microscope images) of a single particle of the copper powder after being formed with an $SiO_2$-system gel coating film. An image of the particle broad surface side is shown at the center of FIG. 10 and an image of the thickness direction surface (side from which the flake-like particle thickness can be seen) is shown above. As can be seen in FIG. 10, a gel coating film of about 20 nm thickness was uniformly adhered to the entire particle surface.

The grain size distribution, composition and oxidation start temperature of the obtained copper powder with $SiO_2$-system gel coating film are shown in comparison with those of the specimen copper powder in Table 5. From the results in Table 5, it can be seen that the oxidation start temperature of the flake-like copper powder was a low 142° C. but the oxidation start temperature of the copper powder of this Example obtained by imparting an $SiO_2$-system gel coating film to the same exhibited superior oxidation resistance, with an oxidation start temperature of 313° C.

TABLE 5

| | Chemical composition (wt %) | | | | Grain size distribution (μm) | | | Oxidation start temp. |
|---|---|---|---|---|---|---|---|---|
| Flake-like copper powder | Si | O | C | Cu | D10 | D50 | D90 | (° C.) |
| Specimen (no coating) | <0.01 | 0.59 | 0.43 | Balance | 8.0 | 17.2 | 42.9 | 143 |
| With $SiO_2$-system coating | 1.6 | 2.9 | 0.21 | Balance | 9.0 | 16.9 | 36.9 | 313 |

As explained in the foregoing, the present invention makes it possible to markedly enhance the oxidation resistance of a copper powder. When the copper powder is used as a conductive paste filler, therefore, it can be prevented from oxidation in the debindering step of the sintering process. Since this eliminates the need for an oxidized copper powder reduction step, the conductive paste sintering step can be simplified. In cases where a high sintering start temperature causes problems, moreover, the sintering start temperature can be dramatically lowered simply by blending in a small amount of glass frit that has good compatibility with the $SiO_2$-system gel coating film. In some cases, the sintering start temperature can be lowered below that of the copper powder itself, i.e., without the $SiO_2$-system gel coating film. As the conductive paste sintering temperature can therefore be decreased, occurrence of thermal strain between ceramic substrates and of heat shock can be mitigated.

What is claimed is:

1. A method for producing oxidation-resistant copper powder comprising:

reacting copper powder, an organosilane compound and water in a water-soluble organic solvent to generate a hydrolysate product of organosilane;

adding a gelling agent to a suspension obtained to form an $SiO_2$-system gel coating film on surfaces of the copper powder particles; and harvesting copper particles having the $SiO_2$-system gel coating film by solid-liquid separation; wherein the reacting step includes the incorporation of another metallic alkoxide in addition to the organosilane compound.

* * * * *